(12) United States Patent
Sano et al.

(10) Patent No.: US 8,502,646 B2
(45) Date of Patent: Aug. 6, 2013

(54) ARTICLE MANAGEMENT APPARATUS AND ITS SYSTEM

(75) Inventors: Kouichi Sano, Shizuoka-ken (JP); Shinji Saegusa, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 271 days.

(21) Appl. No.: 12/686,667

(22) Filed: Jan. 13, 2010

(65) Prior Publication Data
US 2010/0182132 A1   Jul. 22, 2010

(30) Foreign Application Priority Data

Jan. 20, 2009   (JP) .................................. 2009-10112

(51) Int. Cl.
*H04Q 5/22*   (2006.01)

(52) U.S. Cl.
USPC .......... 340/10.1; 340/10.6; 340/5.9; 235/375; 235/385; 700/216

(58) Field of Classification Search
USPC ................ 340/5.92, 5.9, 5.1, 1.1, 10.4, 10.1, 340/5.91, 10.5, 10.6; 235/375, 385; 700/216, 700/265
See application file for complete search history.

(56) References Cited

U.S. PATENT DOCUMENTS

| | | | |
|---|---|---|---|
| 6,935,560 B2 * | 8/2005 | Andreasson et al. | 235/385 |
| 2002/0008623 A1 * | 1/2002 | Garber et al. | 340/572.1 |
| 2005/0240441 A1 * | 10/2005 | Suzuki et al. | 705/2 |
| 2006/0136095 A1 * | 6/2006 | Rob et al. | 700/245 |
| 2007/0122035 A1 * | 5/2007 | Lai et al. | 382/181 |
| 2008/0125897 A1 * | 5/2008 | DiGianfilippo et al. | 700/110 |
| 2010/0019906 A1 | 1/2010 | Kushida et al. | |
| 2010/0141383 A1 | 6/2010 | Sano et al. | |

FOREIGN PATENT DOCUMENTS

| | | |
|---|---|---|
| JP | 2000-154673 | 6/2000 |
| JP | 2005-251209 | 9/2005 |
| JP | 2007-333499 | 12/2007 |

* cited by examiner

*Primary Examiner* — Brian Zimmerman
*Assistant Examiner* — Sara Samson
(74) *Attorney, Agent, or Firm* — Turocy & Watson, LLP (57) ABSTRACT

In an article management apparatus in which the weight of a bottle, including content, placed on a weighing scale is measured and tag data of a radio tag, indicating content of the bottle, which is affixed on the bottle is read out in a non-contact manner by a radio tag reading section through an antenna when the bottle is placed on the weighing scale, a compound data for discriminating whether or not content in a bottle is compoundable with contents in other bottles is stored. It is determined, based on the compound data stored, whether content of a first bottle on which a first radio tag is affixed can be compounded with content of a second bottle on which a second radio tag is affixed when the radio tag reading section reads out tag data of first and second radio tags.

18 Claims, 11 Drawing Sheets

| TAG ID |
|---|
| TAG CLASSIFICATION CODE |
| SECTION |
| USER ID |
| NAME |
| ⋮ |

FIG. 13

ARTICLE MANAGEMENT APPARATUS AND ITS SYSTEM

CROSS-REFERENCE TO RELATED APPLICATION

This application is based upon and claims the benefit of priority from Japanese Patent Application No. 2009-10112, filed on Jan. 20, 2009, the entire contents of which are incorporated herein by reference.

TECHNICAL FIELD

This invention relates, in general, to an article management apparatus which manages content, such as, e.g., chemical or medical substance, in a container. In particular, the invention relates to an article management apparatus which determines whether content in one container is compoundable with content in a container other then the one container based on data from radio tags (RFID tag) affixed to the containers and weights of the containers including respective contents when respective contents of a plurality of containers are compounded with one another.

BACKGROUND

Japanese patent No. 3598341 discloses an apparatus which manages a chemical or medical substance in a container based on the weight of the bottle and a data read out of a radio tag affixed on the bottle in which the chemical or medical substance is housed. This apparatus is comprised by an electronic weighing scales and a radio tag reader/writer. The electronic weighing scales weighs the bottle on the weighing scale. The radio tag reader/writer reads out data from the radio tag affixed to the bottle in a non-contact manner through the antenna provided on the weighing scale of the electronic weighing scales.

By compounding more than two kinds of original chemical or medical substances, it may become a medicine that has a nature different from the original chemical or medical substances. Therefore, it has some fear that there may occur an accident not to be expected by mistaking compound of chemical or medical substances.

The above-described conventional apparatus has a limited function that it only manages contents of respective bottles by respectively weighing the bottles in which respective contents are housed when compounding plural kinds of chemical or medical substances. A decision whether or not a plurality of chemical or medical substances are compoundable is left to a user.

SUMMARY

Accordingly, an aspect of the present invention is to provide an article management apparatus which increases safety of operation in which plural kinds of materials are compounded.

An article management apparatus of the present invention which manages whether or not contents of a plurality of containers on which a radio tag is respectively attached are compoundable with one another, comprises a radio tag reading section configured to read out in a non-contact manner tag data of a radio tag indicating content of one of the containers on which the radio tag is attached, a compound data storing section configured to store a compound data indicating whether content in the one of the containers is compoundable with content in a container other than the one of the containers, a compound determination section configured to determine, if tag data of at least two radio tags within radio tags attached to the plurality of containers are respectively read out, whether content indicated by one of the tag data of the at least two radio tags is compoundable with content indicated by the other tag data based on the compound data stored in the compound data storing section, and an informing section configured to notify the determination result by the compound determination section.

DESCRIPTION OF THE DRAWINGS

This and other aspects and advantages of this invention will become apparent and more readily appreciated from the following detailed description of the embodiments of the invention taken in conjunction with the accompanying drawings wherein.

DETAILED DESCRIPTION

Embodiments of the present invention will now be described in more detail with reference to the accompanying drawings. However, the same numerals are applied to the similar elements in the drawings, and therefore, the detailed descriptions thereof are not repeated.

In the following embodiments, the present invention is applied to an article management apparatus which manages a chemical substance housed in a bottle based on the weight of the bottle in which the chemical substance is housed and tag data from the radio tag attached to the bottle.

First Embodiment

Figure 1:
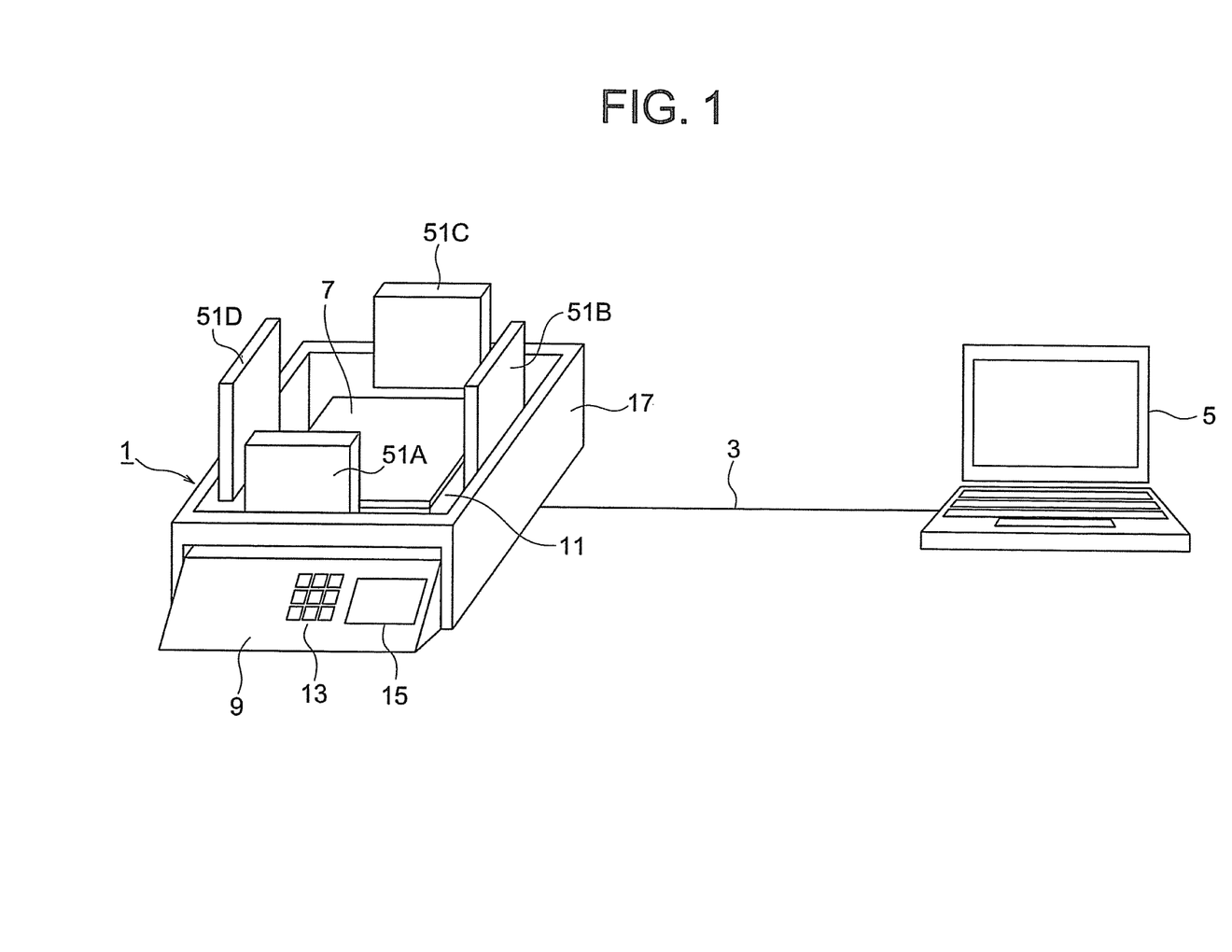
FIG. 1 is a perspective view illustrating an external configuration of an article management apparatus according to a first embodiment of the present invention.
Figure 2:
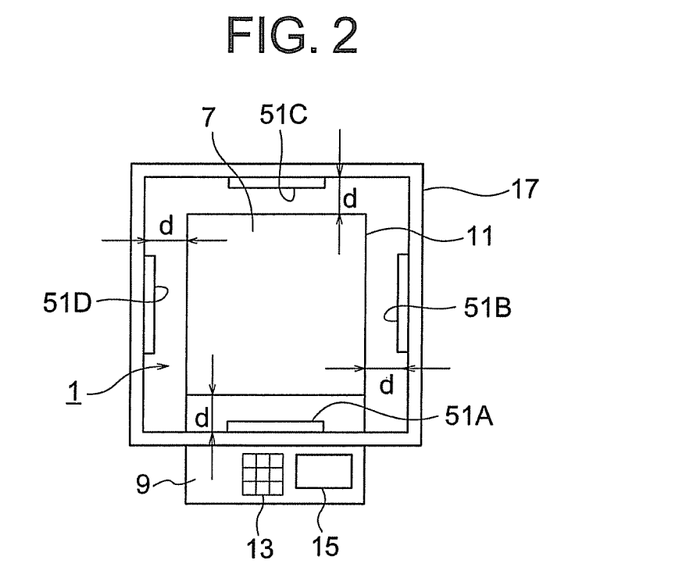
FIG. 2 is a plan view illustrating the article management apparatus shown in FIG. 1.

A construction of an article management apparatus 1 according to the first embodiment will be described with reference to FIGS. 1 and 2.

The article management apparatus 1 is connected to a personal computer 5 through a communication line 3 such as a LAN (Local Area Network), etc. Personal computer 5 serves as an upper level apparatus for the article management apparatus 1.

The article management apparatus 1 has a box-shaped main body 11 in an external appearance. A rectangular-shaped weighing scale 7 is provided at the center of the upper surface of the main body 11. An operation panel 9 is provided at the front surface of the main body 11 such that it is slanted from the front surface. The operation panel 9 includes an input section 13 composed of, e.g., a keyboard, and a display section 15 composed of, e.g., a liquid crystal display.

Rectangular-shaped antenna-supporting elements 17 are provided around the weighing scale 7 such that it has a constant distance "d" from the circumferential walls of the weighing scale 7. As can be seen in FIG. 1, the antenna-supporting elements 17 also enclose the main body 11 except the operation panel 9. The circumferential walls of the weighing scale 7 may be formed in a round shape. In this case, however, it is not necessary to form the antenna-supporting element 17 in the same shape as the weighing scale 7.

The antenna-supporting element 17 supports an antenna of a radio tag reader/writer 50 described later. In this embodiment, the antenna of the radio tag reader/writer 50 includes four plane antennas 51A, 51B, 51C and 51D, which are respectively fixed at corresponding inside walls of the antenna-supporting elements 17, as shown in FIGS. 1 and 2. Each antenna surface of the plane antennas 51A, 51B, 51C and 51D faces the weighing scale 7, respectively. Location of each lower edge of respective antennas 51A, 51B, 51C, and 51D is the same level as that of the upper surface of the weighing scale 7 in a horizontal direction. Therefore, each plane antenna 51A, 51B, 51C, 51D forms a communication area with the radio tag which extends above the weighing scale 7.

Figure 3:
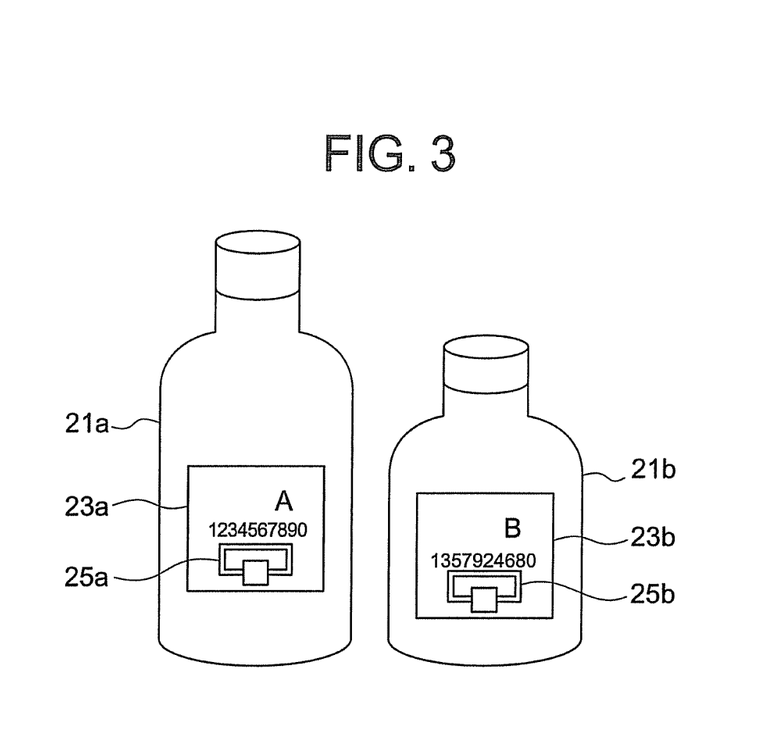
FIG. 3 is a front view illustrating one example of bottles for containing medical substances used in the first embodiment.

FIG. 3 shows an example of a bottle 21(a, b) which is respectively prepared to every chemical substance housed therein. A label 23(a, b) is affixed on the side surface of the bottle 21(a, b). In the label 23, name of the chemical substance (A, B) and chemical substance identification code ("1234567890", "1357924680") are displayed. In addition, a radio tag 25(a, b) is affixed to the label 23(a, b). The radio tag 25 may be attached to the surface of the label or may be sandwiched between the bottle 21 and the label 23.

The radio tag 25 of the present invention is a passive type which has no power source, for example. The radio tag 25 includes a tag antenna and an IC chip, as being well known in this art. The radio tag 25 receives a carrier wave (continuous wave) radiated from the antenna 51(A, B, C, D) of the reader/writer 50 through the tag antenna and generates power from the carrier wave. Using this power, data stored in the memory of the IC chip is read out and is transmitted through the tag antenna with a backscatter system, for example. Or, in response to the instruction by the reader/writer 50, data received by the tag antenna is stored in the memory of the IC chip. These operations are well known in this art.

A tag antenna of the radio tag 25 may be a coiled antenna in case that a magnetic field (13.56 MHz band) is used on the one hand and, may be a dipole antenna in case that an electric field (900 MHz band or 2.4 GHz band) is used on the other hand. A loop antenna may also be used.

Figure 4:
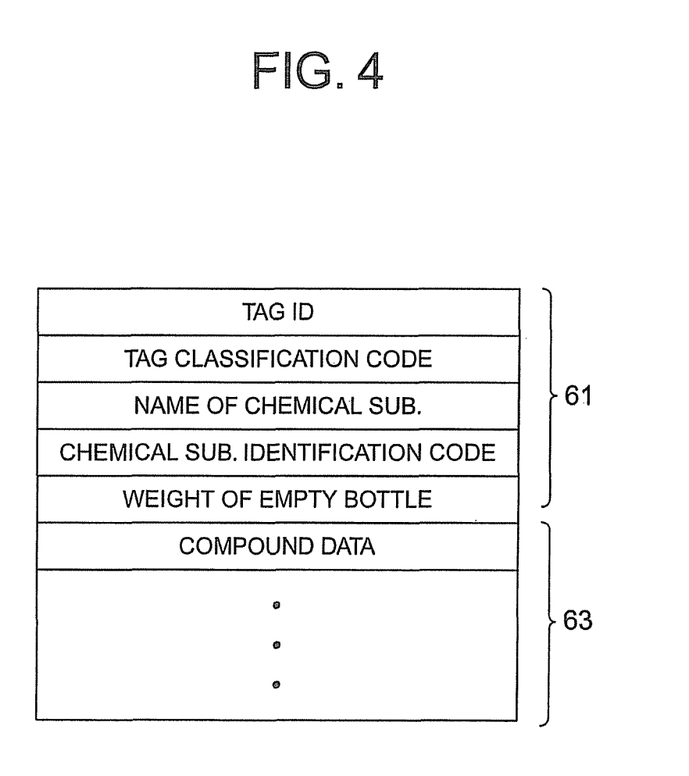
FIG. 4 is a view indicating data items stored in a radio tag for a bottle, shown in FIG. 3, used in the first embodiment.

The radio tag 25 stores data items shown in FIG. 4 in its memory. The data items include a tag identification data 61 for identifying a radio tag 25 and a plurality of compound data 63. The tag identification data 61 includes, for example, a tag ID, a tag classification code, a name of chemical substance, a chemical substance identification code and a weight data of empty bottle (W0).

The tag ID is a unique code for specifying a radio tag 25. The tag classification code is a code for specifying that radio tag 25 is for a chemical substance. The name of chemical substance and the chemical substance identification code are a title and its identification code for the chemical substance that is housed in the bottle 21(a, b) on which the radio tag 25(a, b) is attached. The weight data of empty bottle (W0) is a weight of bottle 21(a, b) in a state that a chemical substance is not housed in the bottle 21(a, b).

The above-described compound data 63 includes identification codes of other chemical substances which are able to be compounded with the chemical substance housed in the bottle 21 on which the radio tag 25 is affixed. Therefore, in this embodiment, the memory of the radio tag 25 serves as a compound data storing section which stores data for identifying chemical substances compoundable with chemical substances housed in respective bottles 21.

A construction of the article management apparatus 1 will be described with reference to FIG. 5. The article management apparatus 1 includes in its main body a CPU 101, a ROM 103, a RAM 105, a clock section 107 and a communication interface 109. ROM 103 stores a program performed by the management apparatus 1 and RAM 105 provides CPU 101 with its work area. The communication interface 109 carries out, for example, communication with a personal computer acting as an upper level apparatus.

The article management apparatus 1 further includes an operation panel controller 111, a weight detection section 113 and a radio tag reader/writer 50. The above-described CPU 101, ROM 103, RAM 105, clock section 107, communication interface 109, operation panel controller 111, weight detection section 113 and radio tag reader/writer 50 are connected with one another through a bus line 115.

The radio tag reader/writer 50 is composed of a transmitting section, a reception section, a circulator, an antenna turnover section and a control section which controls these sections, as is well known in the art.

The transmitting section includes a modulator and an amplifier. The modulator modulates a carrier wave with data to be transmitted to the radio tag. The amplifier amplifies the modulated carrier wave. The amplified carrier wave is provided to the circulator.

The circulator has a function that provides the carrier wave from the transmitting section to each antenna 51A~51D on the one hand and a function that provides a signal from the radio tag received by each antenna 51A~51D to the reception section on the other hand.

The reception section includes an amplifier and a demodulator. The amplifier amplifies a reception signal from each antenna 51A~51D and then the demodulator demodulates a reception data from the amplified reception signal. The demodulated reception data is sent to the control section.

The control section has a function that provides, upon instruction from CPU 101, a transmitting data to the transmitting section on the one hand and a function that acquires tag data from the reception data demodulated by the reception section on the other hand. In addition, the control section controls the turnover operation by the antenna turnover section. The antenna turnover section sequentially changes the connection between the circulator and respective antennas 51A~51D In this embodiment, the radio tag reader/writer 50 acts as a tag data reading section which reads out through one of the antennas 51A~51D in a non-contact manner data of the radio tag 25 attached to the bottle 21 placed on the weighing scale 7.

The weight detection section 113 measures the weight of an article placed on the weighing scale 7. The operation panel controller 111 controls the input section 13 and the display section 15 provided on the operation panel 9. The clock section 107 counts time to indicate a current time & day. The communication interface 109 controls data communication with a personal computer connected through the communication line 3 as shown in FIG. 1.

Figure 6:
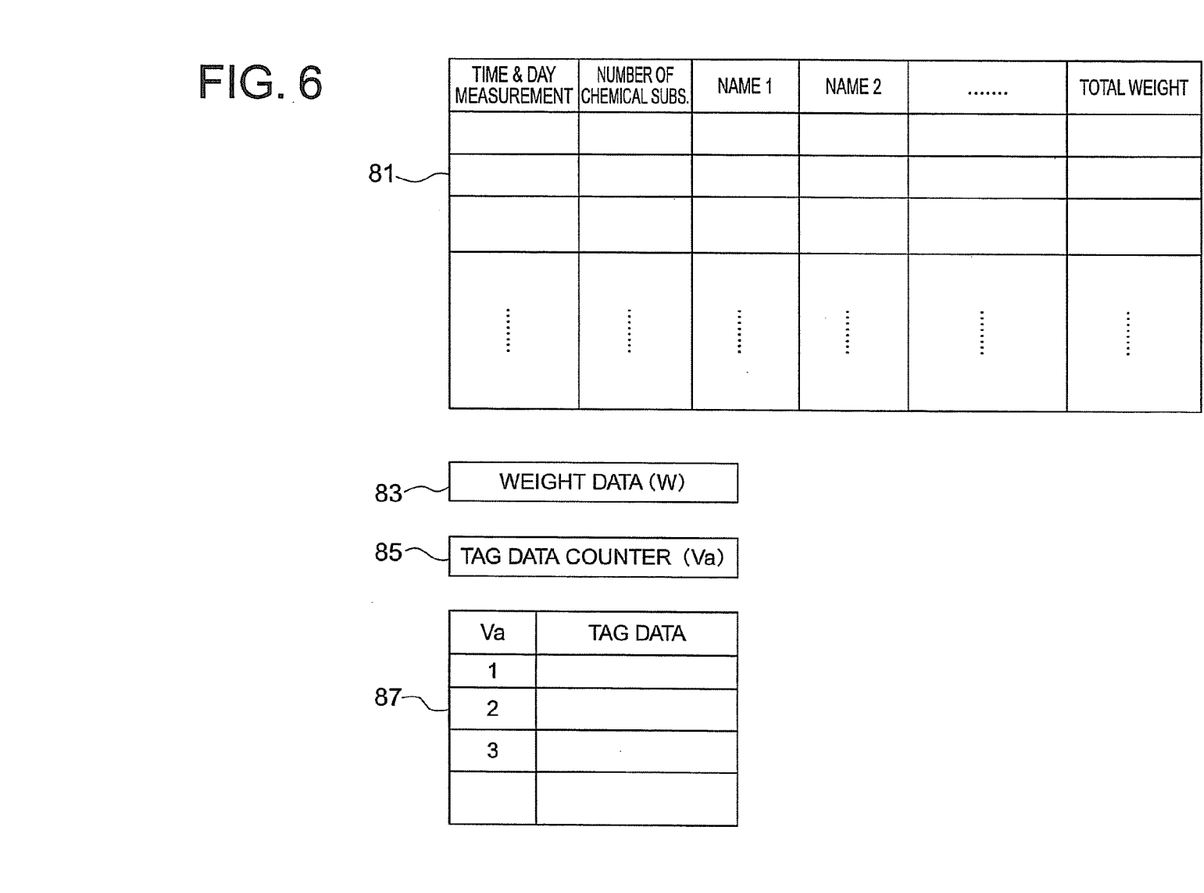
FIG. 6 is a view illustrating memory areas assigned in a RAM of the article management apparatus.

RAM 105 includes, in particular, areas shown in FIG. 6, i.e., an article management file 81, a weight data buffer 83, a tag data counter 85 and a tag data buffer 87 to store a variable data such as an input data, a calculating data and so forth.

The article management file 81 stores an article management record composed of data items of a time & day of measurement, a number of chemical substances, name of respective chemical substances and a total weight. The weight data buffer 83 stores a weight data (W) measured by the weight detection section 113. The tag data counter 85 counts a number of radio tags (N) detected by the radio tag reader/writer 50. The tag data buffer 87 stores data of radio tags, in order, detected by the radio tag reader/writer 50.

A control process carried out by CPU 101 will be described with reference to FIGS. 7~9.

CPU 101 operates in accordance with a program stored in the ROM 102. For example, a reset signal is input by pressing a reset button provided in the input section 13 and then CPU 101 initiates a control process.

In act ST1, CPU 101 performs an initialization process and the weight detection section 113 enters into a weight-determined mode. The radio tag reader/writer 50 enters into a stop state.

In act ST2, CPU 101 enters into a standby state and then waits until the weight detection section 113 changes over its mode to a variable mode. The weight detection section 113 changes over its mode from the weight-determined mode to the variable mode when an article (bottle) is placed on the weighing scale 7 and begins a weight measurement (YES-path in act ST2). CPU 101 resets the tag data counter 85 to zero "0" in act ST3. After that, CPU 101 instructs an operation start to the radio tag reader/writer 50 in act ST4 and enters into a standby state.

Up on the starting instruction from CPU 101, the radio tag reader/writer 50 generates a command for reading tag data of a radio tag and provides a carrier wave signal modulated with the data reading command to each antenna 51A~51D, sequentially. The carrier wave signal provided is radiated from antennas 51A~51D with UHF band, for example. The radiated carrier wave signal reaches an area at least above the weighing scale 7. Therefore, if the bottle 21 is placed on the weighing scale 7, the radio tag 25 attached on the label 23 of the side surface of the bottle 21, as shown in FIG. 3, surely receives the carrier wave signal from at least one of the antennas 51A~51D.

When the radio tag 25 receives the carrier wave signal, the radio tag 25 demodulates the carrier wave signal and understands the command from the demodulated signal. If the command is a data reading command, a tag data (tag identification data 61 and compound data 63) in the memory is read out and a signal modulated with the tag data is transmitted toward at least one of the antennas 51A~51D with a backscatter system. The signal modulated with the tag data received by the at least one of the antennas 51A~51D is acquired by the radio tag reader/writer 50. The radio tag reader/writer 50 reads the tag data from the signal modulated and notifies the reading of the tag data to CPU 101 (YES-path in act ST5). Otherwise, act ST10 described below is carried out (NO-path in act ST5).

CPU 101 carries out act ST6 upon receiving notification of reading the tag data. CPU 101 retrieves the tag data buffer 87 using the tag ID of the tag identification data and judges whether or not a tag data identical with the tag data which is read out this time is already stored in the buffer 87.

If the tag data read out this time is not stored in the buffer 87 (NO-path in act ST6), CPU 101 increases the value (Va) by one in the tag data counter 85 in act ST7. And then, in act ST8, CPU 101 stores the tag data (tag identification data 61 and compound data 63) that is read out this time in the data area of the tag data buffer 87 using the value (Va) of the tag data counter 85, as an address. On the other hand, if the tag data read out this time is already stored in the buffer 87 (YES-path in act ST6), act ST9 is carried out and the tag data read out this time is renounced.

Next, CPU 101 determines whether or not the weight detection section 113 enters into the weight-determined mode in act ST10. In case that the weight detection section 113 does not enter into the weight-determined mode, CPU 101 waits until a next radio tag data is read out (act ST5). CPU 101 carries out the above acts ST6, ST7 and ST8, or acts ST6 and ST9 every time that a tag data of radio tag 25 is read out until the weight detection section 113 comes into the weight-determined mode.

When the weighing operation by the weight detection section 113 is completed and thus the determined weight (W) is obtained, the weight detection section 113 comes to the weight-determined mode (YES-path in act ST10) and step ST11 is performed. CPU 101 stores in the weight data buffer 83 the determined weight (W) weighed.

In step ST12, CPU 101 determines whether the determined weight (W) is "0" or not. For example, in case that a user of the article management apparatus 1 places the bottle 21 on the weighing scale 7 but he or she removes the bottle 21 from the weighing scale 7 before the weight of the bottle 21 is determined, the determined weight (W) is "0". If the determined weight (W) is "0" (YES-path in act ST12), CPU 101 instructs the radio tag reader/writer 50 to stop the operation in act ST13 and then terminates its operation. Therefore, the radio tag reader/writer 50 stops transmission of the carrier wave signal from antennas 51A~51D.

Figure 7:
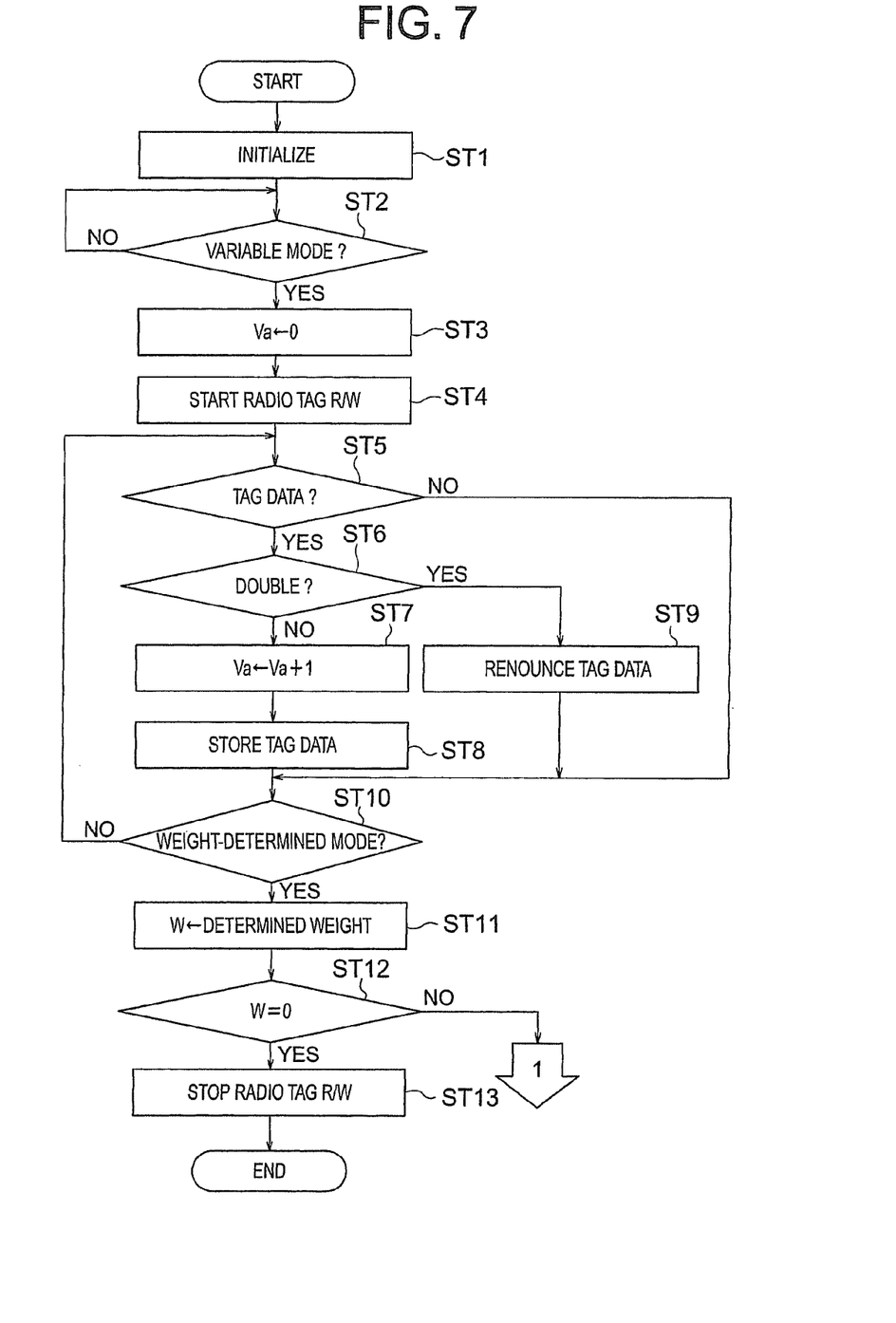
FIG. 7 is a flow chart showing processes conducted by a CPU of the article management apparatus.
Figure 8:
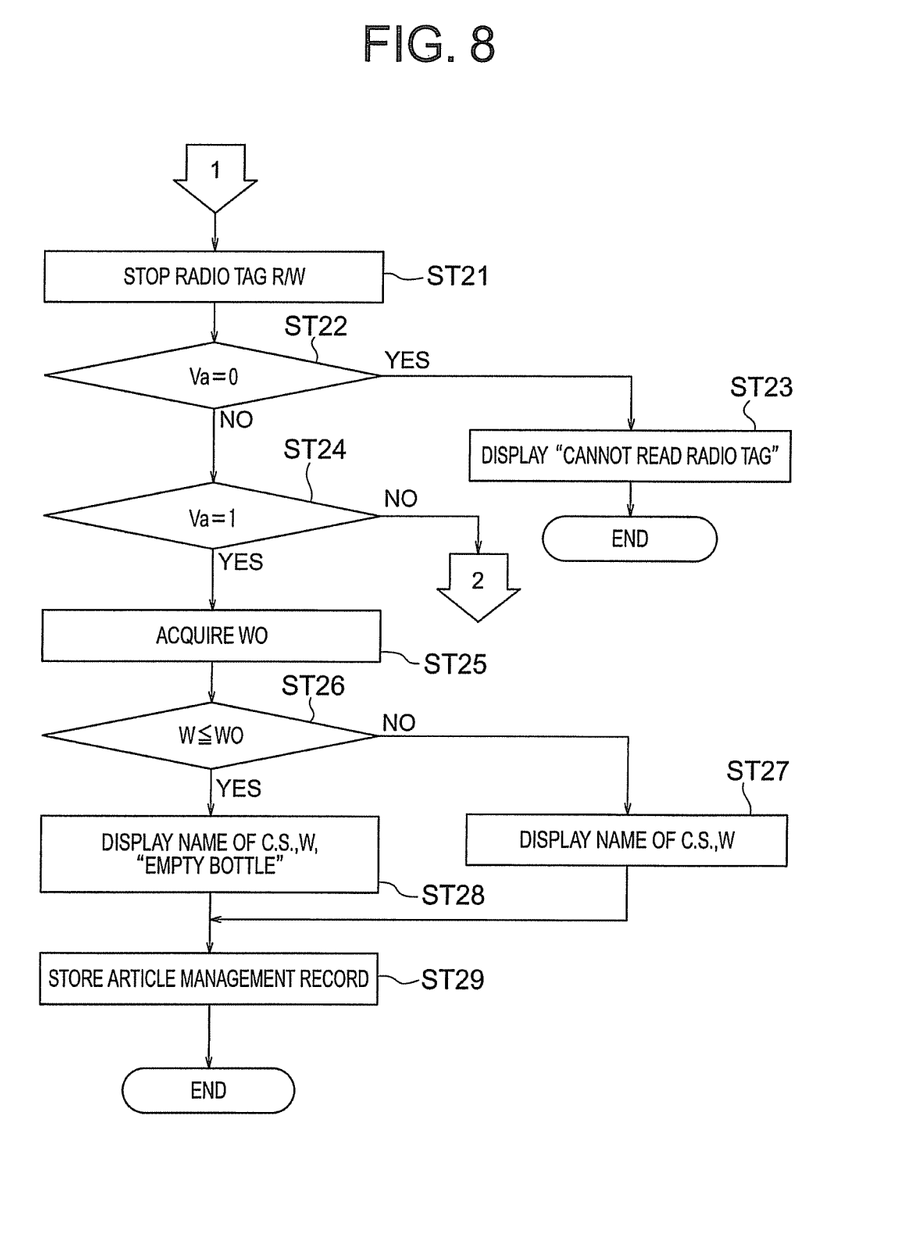
FIG. 8 is a flow chart showing processes subsequent to one of decision processes shown in FIG. 7.

In act ST12, in case that the determined weight (W) is not "0" (W>0) (NO-path in act ST12), CPU 101 instructs the radio tag 25 to stop the operation (act ST21 in FIG. 8). After that, in act ST22, CPU 101 judges whether the value (Va) of the tag data counter 85 is "0".

In case that no tag data of radio tag 25 is read out by the radio tag reader/writer 50 during the period from the weight detection section 113 becoming the variable mode to the weight detection section 113 becoming the weight-determined mode, the value (Va) of the tag data counter 85 maintains "0". In this case, in act ST22, YES-path is taken and act ST23 is performed. CPU 101 instructs the display 15 to display a message "Cannot read Radio Tag" and terminates its control operation.

On the other hand, if the value (Va) of the tag data counter 85 is other than "0", NO-path is taken in act ST22 and act ST24 is executed. CPU 101 determines whether the value (Va) of the tag data counter 85 is one "1".

In case that a number of radio tags 25 read out by the radio tag reader/writer 50 is one "1" during a period from the weight detection section 113 becoming the variable mode to it becoming the weight-determined mode, the value (Va) of the tag data counter 85 is "1". In this case, YES-path is taken in act ST24 and act ST25 is executed.

CPU 101 acquires the weight data of empty bottle (W0) of the tag identification data 61 constituting part of tag data of the radio tag 25 which is stored in the tag data buffer 87 at an address "Va" (=1). And, in act ST26, CPU 101 determines whether the determined weight (W) stored in the weight data buffer 83 is equal to or smaller than the weight of empty bottle (W0).

If the determined weight (W) is greater than the weight of empty bottle (W0), NO-path is taken in act ST26 and act ST27 is performed. CPU 101 acquires the name of chemical substance of the tag identification data and instructs the display section 51 to display this name of chemical substance and the determined weight (W). On the other hand, if the determined weight (W) is equal to or smaller than the weight of empty bottle (W0), YES-path is taken and thus act ST28 is performed.

CPU 101 acquires the name of chemical substance of the tag identification data and instructs the display section 15 to display information that the bottle 21 is empty together with the name of chemical substance and the determined weight (W) to notify a user.

After act ST27 or act ST28 is performed, CPU 101 acquires the present time & day data time-counted by the clock section 107 and then, in act ST29, CPU 101 stores in the article management file 81 the article management record including the present time & day data acquired, the determined weight, the value (Va) of the tag data counter 85, i.e., a number of chemical substances, and name of chemical substance of each tag identification data 61 and the control process thereof is terminated.

A process of the case that the value (Va) of the tag data counter 85 is greater than "1" will be described with reference to FIG. 9.

Figure 9:
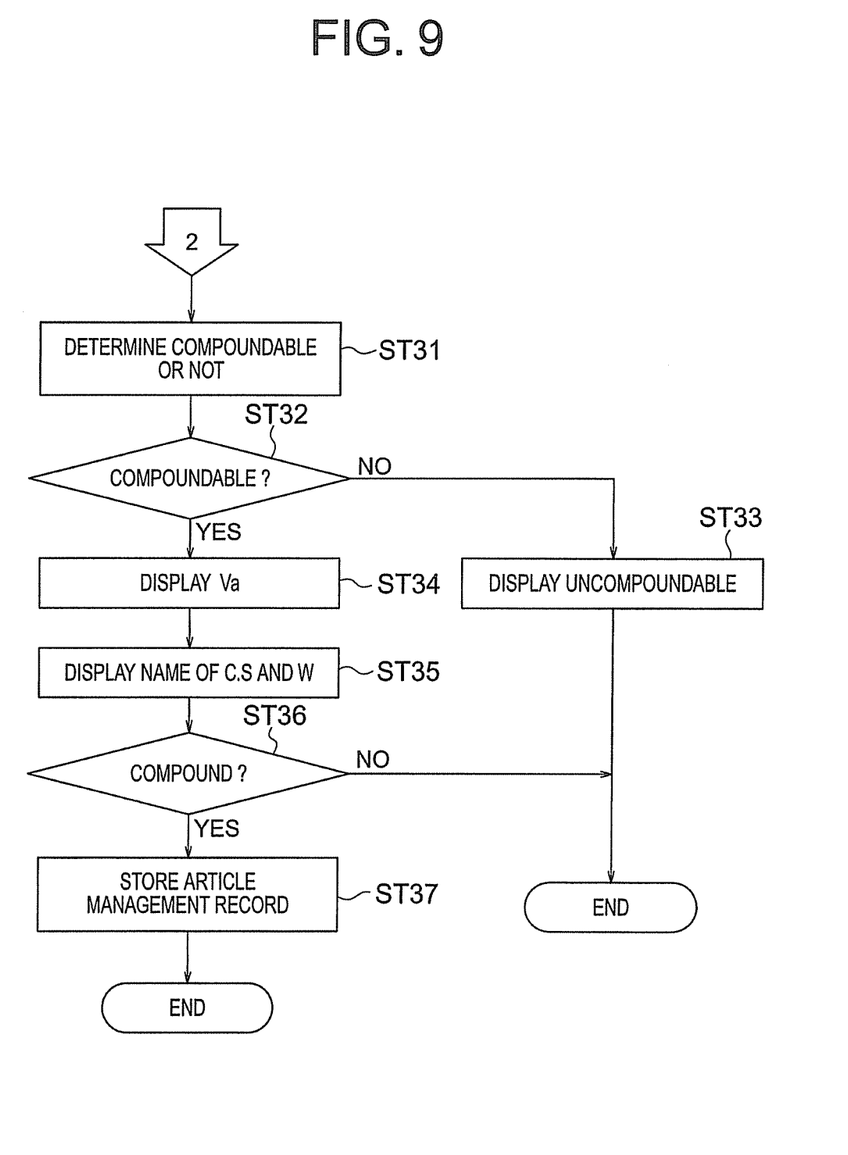
FIG. 9 is a flow chart showing processes subsequent to one of decision processes shown in FIG. 8.

In act ST24 shown in FIG. 8, when NO-path is taken, act ST31 is performed, as shown in FIG. 9. CPU 101 acquires respective compound data 63 from tag data of a plurality of radio tags 25 (tag identification data 61 and compound data 63) stored in the tag data buffer 87. Then, CPU 101 determines whether respective chemical substances housed in a plurality of bottles 21 on which a radio tag 25(a, b) is respectively affixed are compoundable with one another (compound determination section).

A case that the value (Va) of the tag data counter 85 is "2" will be explained. Respective tag data of a first radio tag 25a and a second radio tag 25b have been stored in tag data buffer 87 at each address (1 and 2) thereof. CPU 101 acquires a chemical substance identification code from a compound data 63-1 (not shown) contained in the tag data of the first radio tag 25a stored in the tag data buffer 87 at the address 1.

A compound data 63-2 contained in the tag data of the second radio tag 25b is retrieved with the acquired chemical substance identification code as a retrieval key.

As a result, if a chemical substance identification code identical with the acquired chemical substance identification code (retrieval key) is extracted, CPU 101 determines that the chemical substance A housed in the bottle 21a on which the first radio tag 25a is affixed is compoundable with the chemical substance B housed in the bottle 21b on which the second radio tag 25b is affixed. Otherwise, it is determined that the chemical substances A and B are uncompoundable.

Next, a case that the value (Va) of the tag data counter 85 is "3" will be described. In this case, respective tag data of first to third radio tags 25a, 25b and 25c (not shown) have been stored in respective areas of the tag data buffer 87 corresponding to respective addresses (1, 2 and 3).

CPU 101 acquires a chemical substance identification code from the compound data 63-1 contained in the tag data of the first radio tag 25a, as described above. A compound data 63-2 contained in the tag data of the second radio tag 25b is retrieved with the acquired chemical substance identification code as a retrieval key.

As a result, if a chemical substance identification code identical with the retrieval key is extracted from the compound data 63-2, a compound data 63-3 (not shown) contained in the tag data of the third radio tag 25c is also retrieved with the same retrieval key.

In case that a chemical substance identification code identical with the retrieval key is extracted from the compound data 63-3, CPU 101 determines that the chemical substance A housed in the bottle 21a on which the first radio tag 25a is affixed, the chemical substance B housed in the bottle 21b on which the second radio tag 25b is affixed and the chemical substance C housed in the bottle 21c (not shown) on which the third radio tag 25c is affixed are all compoundable.

Contrary to the above, in case that the chemical substance identification code as a retrieval key can not be extracted from at least one of the compound data 63-2 of the tag data of the second radio tag 25b and the compound data 63-3 of the tag data of the third radio tag 25c, CPU 101 determines that chemical substances A, B and C are not compoundable.

In case also that the value (Va) of the tag data counter 85 is "4", CPU 101 determines whether or not chemical substances respectively housed in bottles are compoundable as similar to the above-described processes.

In act ST32 shown in FIG. 9, if determining chemical substances being uncompoundable, act ST33 is taken (No-path in act ST32). In act ST33, a message that notifies chemical substances being uncompoundable is displayed on the display section 15 and the control process is terminated.

On the other hand, if determining chemical substances being compoundable in act ST32, act ST34 is taken (YES-path in act ST32). CPU 101 makes the display section 15 display the value (Va) of the tag data counter 85 as a number of chemical substances to be compounded. Furthermore, in act ST35, CPU 101 reads out respective name of chemical substances from respective tag identification data 61 of all the tag data which are stored in the tag data buffer 85 at addresses from the address "1" to the address "Va". And then, each name of chemical substances and the determined weight (W) stored in the weight data buffer 83, i.e., total weight of respective bottles, are displayed on the display section 15.

In the state that a number of chemical substances to be compounded, each name of chemical substances and the total weight are displayed, CPU 101 waits input from the input section 13 in act ST36. A user selectively inputs "YES compound" if a plurality of chemical substances placed on the weighing scale 7 are compounded or "NO compound" if the compound is not performed. If receiving "NO compound" input (NO in act ST36), the control process is terminated.

If receiving "YES compound" input (YES in act ST36), CPU 101 acquires a present time & day data time-counted by the clock section 107. CPU 101 stores the article management record including the present time & day data, the determined weight (W), a number of chemical substances to be compounded (Va) and each name of chemical substances in the article management file 81. Then, the present control process is ended.

As described above, the article management apparatus 1 automatically determines whether chemical substances respectively housed in a plurality of bottles 21 are compoundable and notifies the result of it when the plurality of bottles 21 are placed on the weighing scale 7. Therefore, an accident caused by mistaking compound of chemical substances can be prevented.

The article management apparatus 1 displays a number of chemical substances on the display section 15 if chemical substances respectively housed in the plurality of bottles 21 are compoundable. Therefore, a user can confirm whether a number of chemical substances coincides with a number of bottles placed on the weighing scale 7 and recognizes that chemical substances housed in the respective bottles 21 are compoundable if coinciding with one the other.

A radio tag 25 applied to a bottle 21 is one of electronic parts and thus there is a possibility of out of order. Or there is also a case that a radio tag reader/writer 50 fails to read out tag data from a radio tag 25. In those cases, a number of radio tags 25 that are read by the radio tag reader/writer 50 is smaller than a number of bottles 21 actually placed on the weighing scale 7. However, the article management apparatus 1 cannot make self-determination whether there is a radio tag that was not read.

It may consider that the article management apparatus 1 determines that chemical substances are compoundable based on the tag data of radio tags 25 which could be read. In this case also, a number of chemical substances that is determined as being compoundable is displayed on the display section 15. A user can confirm a number of bottles placed on the weighing scale 7 and a number of chemical substances displayed on the display section 15.

Thus, if a number of bottles and a number of chemical substances do not coincide with one the other, it can be understood that there is a radio tag that was not read. In this case, a user realizes that compound cannot be performed. In this manner, an accident caused by compounding chemical substances that are not compoundable can be prevented.

In Japanese patent No. 3598341 described as a prior art, since an antenna is provided on the weighing scale of an electronic weighing scales, it is required to affix a radio tag on the bottom surface of a bottle. Therefore, the bottle is not stable when the bottle is placed on the weighing scale and thus it is considered that the bottle may come down during weighing. Also, if the bottle is placed on a shelf or a desk, etc., the radio tag is apt to be degraded if the radio tag contacts the surface placed.

According to the article management apparatus 1 of the above-described first embodiment, four plane antennas 51A, 51B, 51C and 51D are provided such that the antennas surround the weighing scale 7 and the communication area with a radio tag is formed over the weighing scale 7. In this embodiment, a radio tag can be attached to the side surface of the bottle 21 and thus, the radio tag reader/writer 50 can surely read out tag data of the radio tag 25 affixed on the bottle 21. The first embodiment can resolve problems of the prior art described above.

Second Embodiment

Figure 10:
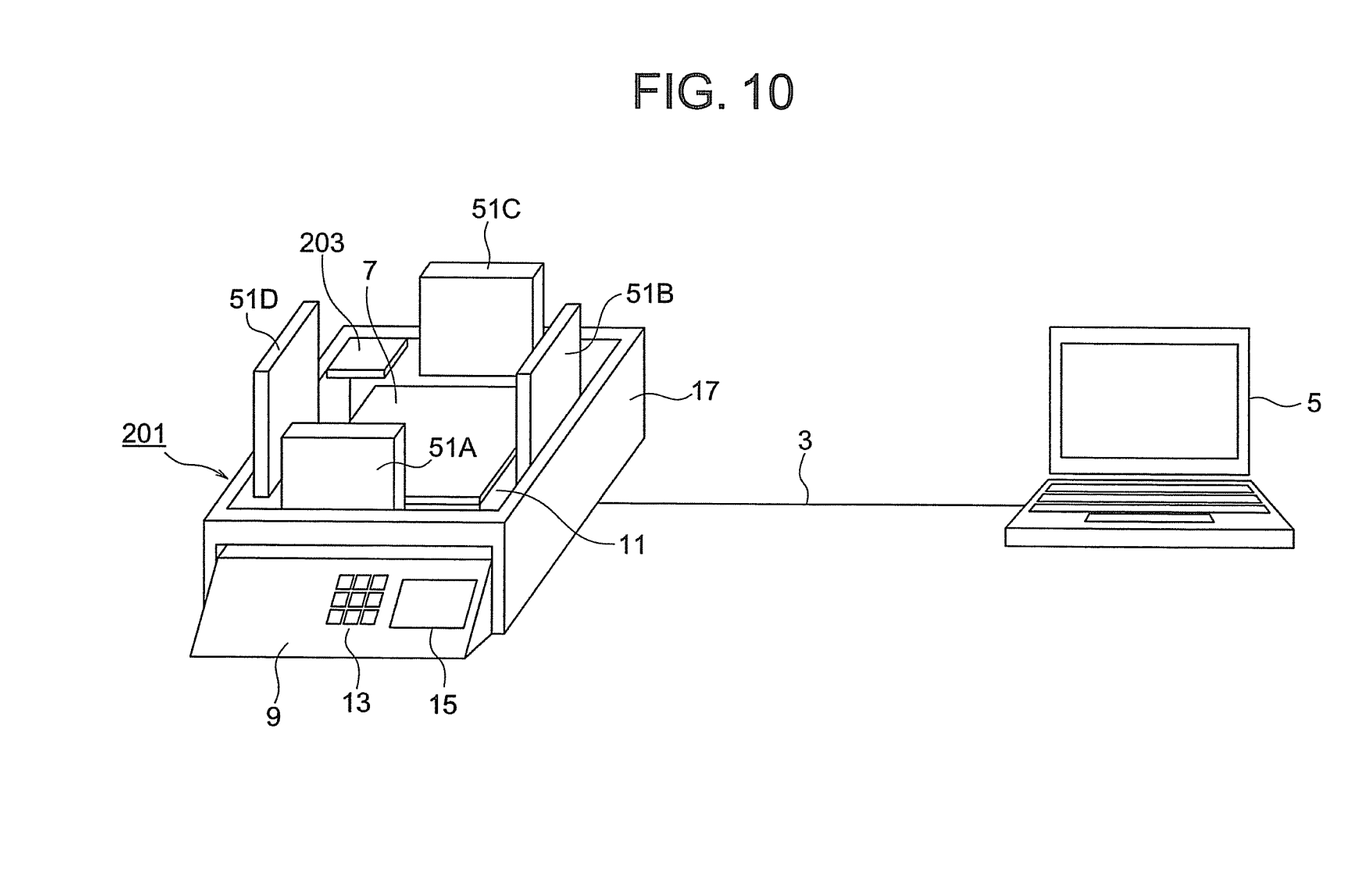
FIG. 10 is a perspective view illustrating an external configuration of an article management apparatus according to a second embodiment of the present invention.

External construction of an article management apparatus 201 according to a second embodiment will be described with reference to FIG. 10. In FIG. 10, the same numerals are applied to elements similar to that in the first embodiment, and therefore, the detailed explanations thereof are not repeated.

Figure 11:
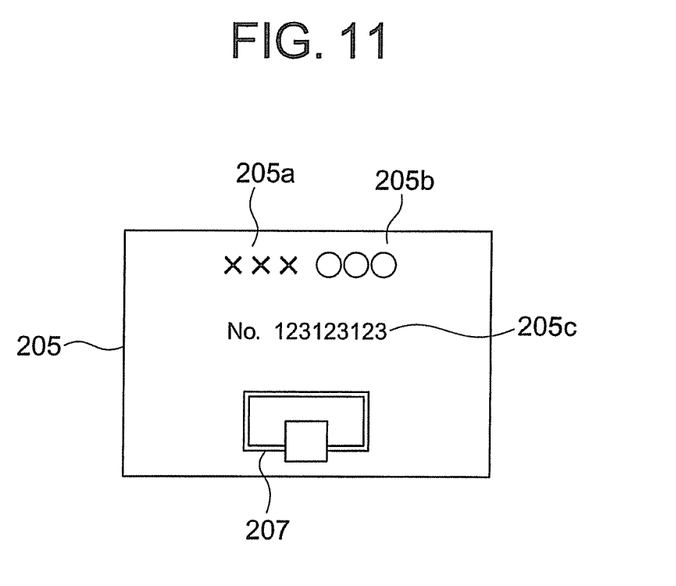
FIG. 11 is a view illustrating a user ID card used in the second embodiment.

An article management apparatus 201 includes a user card supporting section 203 that is provided at one corner of rectangular-shaped antenna-supporting elements 17. One example of the user card 205 supported by the user card supporting section 203 is shown in FIG. 11.

The user card 205 is an ID card issued to a user who is authorized to use the article management apparatus 201. On the surface of the user card, a section name 205a that the user belongs to, a user name 205b and a user ID 205c are printed as shown in FIG. 11. The user card 205 includes therein a radio tag 207 (herein referred to as a user RF tag). A user puts the user card 205 on the user card supporting section 203 prior to using the article management apparatus 201.

Figure 12:
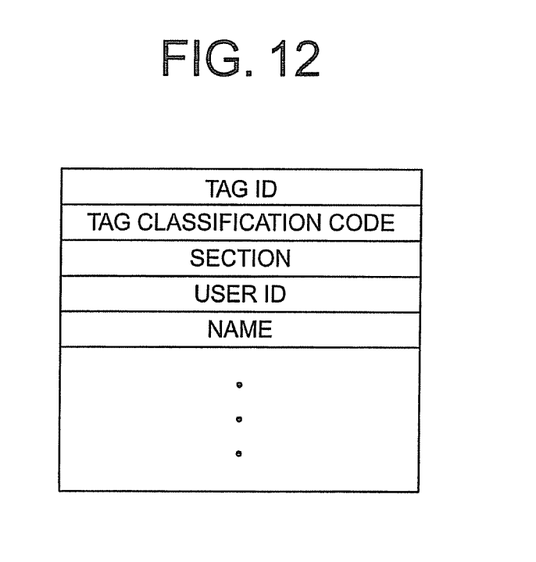
FIG. 12 is a view showing data items stored in a radio tag for the user ID card, shown in FIG. 11, used in the second embodiment.

The user RF tag 207 is a passive type RF tag, for example, which has no power source. The user RF tag 207 stores data having items shown in FIG. 12. The data of the user RF tag 207 includes a tag ID, a tag classification code, a name of section that a user belongs to, a user ID number, a user name, etc. The tag ID is a unique code that differs from every user RF codes. The tag classification code is a code which specifies a user RF tag 207. It need hardly be said that a tag classification code of the user RF tag 207 is different from a tag classification code of the radio tag attached to the bottle in which a chemical substance is housed. The name of section that a user belongs to, the user ID number and the user name are information relating to a user who possesses a user card 205 on which this user RF tag 207 is mounted.

Figure 5:
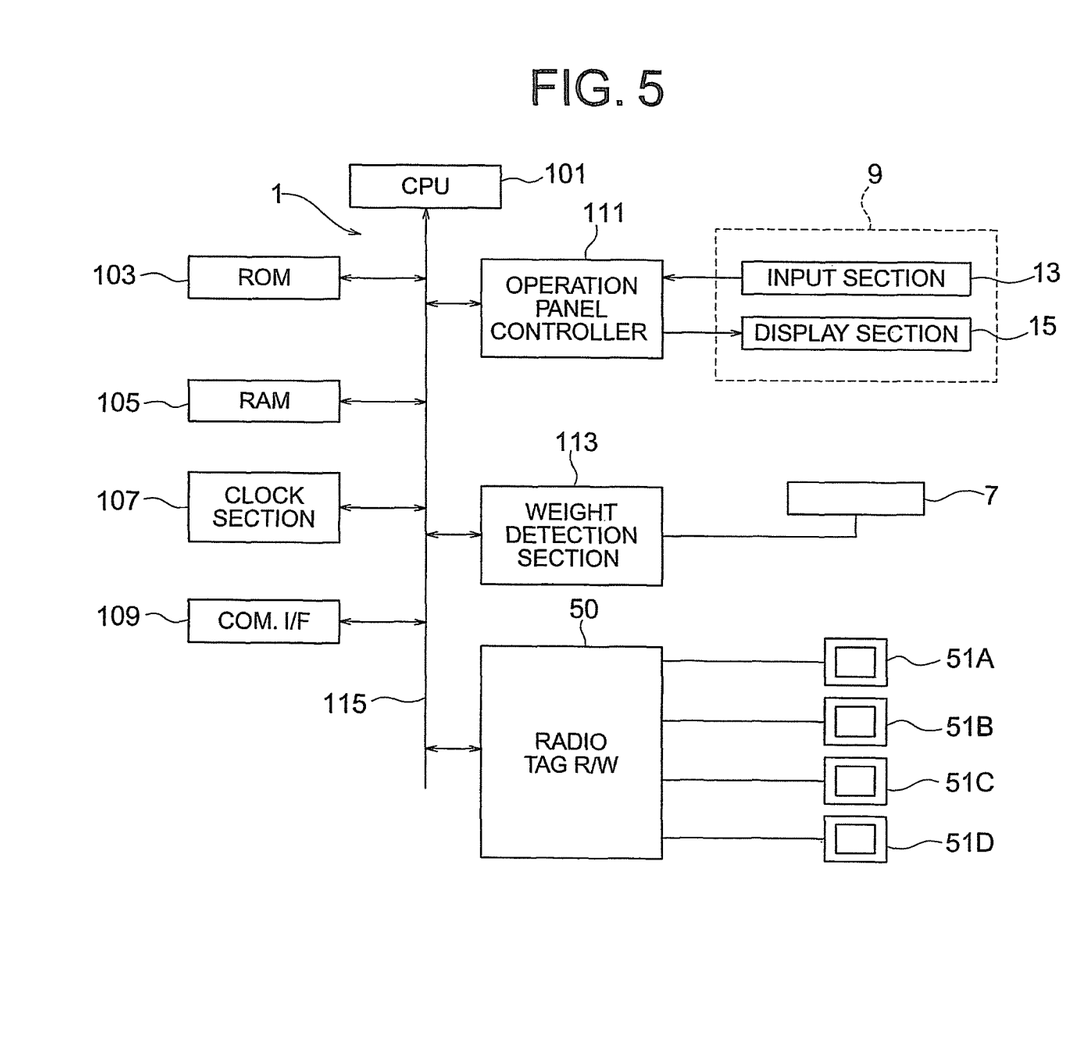
FIG. 5 is a block diagram illustrating an essential construction of the article management apparatus shown in FIG. 1.

An internal construction of the article management apparatus 201 is the same as that in the first embodiment shown in the block diagram of FIG. 5. Also, a memory area formed in RAM 105 is the same as that in the first embodiment shown in the general view of FIG. 6.

An operation of the article management apparatus 201 according to the second embodiment will be described.

As being similar to the first embodiment, CPU 101 performs processes from act ST1 to act ST13 of FIG. 7, sequentially when a reset signal is inputted by pressing down the reset button provided in the input section 13. In act ST 12 in FIG. 7, CPU 101 performs processes shown in the flowchart of FIG. 13 if the determined weight (W) is not zero "0", i.e., greater than "0" (NO in act ST12).

Figure 13:
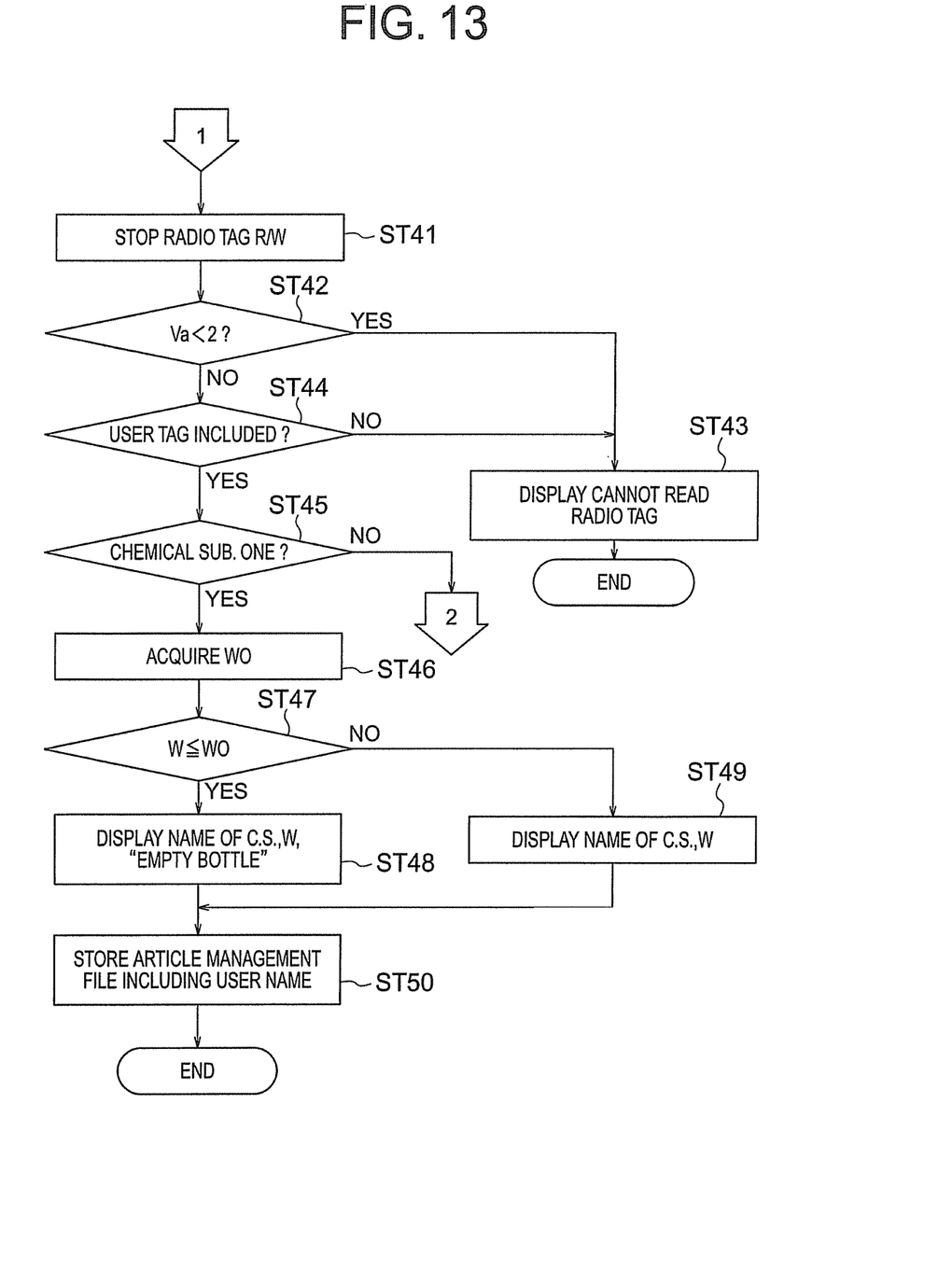
FIG. 13 is a flow chart showing processes performed by a CPU of the article management apparatus shown in FIG. 10.

In act ST41, CPU 101 instructs stop of the operation of the radio tag reader/writer 50. After that, in act ST42, CPU 101 determines whether or not the value (Va) of the tag data counter 85 is smaller than "2". The value (Va) of the tag data counter 85 is "1" if a number of tag data that is read out by the radio tag reader/writer is one during a period that the weight detection section 113 is changed from the variable mode to the weight-determined mode.

In this embodiment, a user who uses the article management apparatus 201 places its user card 205 on the user card supporting section 203 prior to its use of the apparatus 201. In the using state, the radio tag reader/writer 50 reads out data of the user RF tag 207 of the user card 205 and data of the radio tag 25 of at least one of the bottles 21. Thus, if the value (Va) of the tag data counter 85 is smaller than "2" (YES in act ST42), CPU 101 makes the display section 15 display a message that the reading of radio tag is impossible (act ST43), and the control process is terminated.

In act ST42, if the value (Va) of the tag data counter 85 is equal to or greater than "2", NO-path is taken and act ST44 is executed. It is determined whether a tag data of the user RF tag 207 is included in the tag data stored in the tag data buffer 87 (user existence determination section). This determination is performed as to whether there is a tag classification code in the data. If the tag data of the user RF tag 207 is not included, NO-path is taken and the above-described act ST 43 is performed. A message that reading of radio tag is impossible is displayed on the display section 15 and the control process is terminated.

In act ST44, if the tag data of the user RF tag 207 is included, YES-path is taken and act ST45 is executed. In act ST45, CPU 101 counts a number of data of the radio tag 25 affixed to the bottle 21 in the tag data stored in the tag data buffer 87. If the data of the radio tag 25 is one, YES-path is taken and processes from act ST46 to act ST50 are performed. These acts are similar to processes from act ST25 to act ST29 of the first embodiment shown in FIG. 8.

However, a difference between the first embodiment and the second embodiment is a process of act ST50 (act ST29 in the first embodiment). The name included in the tag data of the user RF tag 207 is stored in the article management file as a user name in addition to the time & day, the determined weight (W), a number of chemical substances and names of chemical substances.

In act ST45, if more than two tag data of the radio tag 25 are included in the tag data buffer 87, NO-path is taken and processes from act ST31 to act ST37 of the first embodiment shown in FIG. 9 are performed. In this case also, as being similar to the process of the above act ST50, the name included in the tag data of the user RF tag 207 is stored in the article management file as a user name in addition to the data (time & day, a number of compound chemical substances, chemical substance names and total weight) in act ST37.

As described above, in the article management apparatus 201 of the second embodiment, only the case that data of the user RF tag 207 is read out by the radio tag reader/writer 50 can take act ST45 in FIG. 13. Therefore, there is a merit that a user can be identified in addition to the merits of the first embodiment.

In the above-described embodiments, the compound data of chemical substance housed in the bottle 21 that the radio tag 25 is affixed is stored in that radio tag 25. However, the compound data of chemical substances may be stored in ROM 103 of the article management apparatus 1 (201) corresponding to the chemical substance classification code of each chemical substance. In this case, CPU 101 retrieves data in ROM 103 using the chemical substance identification code of the tag identification data 61 of the radio tag 25 as a retrieval key and determines whether or not subject plural medical substances are compoundable in the process of act ST32.

The compound data may include an identification code of other chemical substance which inhibits compound with the subject chemical substance. Or, it may be a flag specifying that it is compoundable with other chemical substance.

The article management apparatus 1 (201) is not limited to the above-described embodiments. For example, the radio tag reader/writer 50 may be provided outside the main body of the apparatus 11. In stead of plane antennas 51A~51D, a leaky coaxial cable may be used as an antenna of the radio tag reader/writer 50 such that it is provided along the outer circumferential surface of the weighing scale 7.

Items subject to be managed are not limited to a chemical substance. It may also be materials to be compounded, e.g., perfumery, dyes, etc. Container is not also limited to bottles.

The present invention has been described with respect to specific embodiments. However, other embodiments based on the principles of the present invention should be obvious those of ordinary skill in the art. Such embodiments are intended to be covered by the claims.

What is claimed is:

1. An article management apparatus that determines whether contents of a plurality of containers on which radio tags are respectively attached are compoundable with one another, comprising:
a weighing scale;
a weighing section configured to weigh the plurality of containers on the weighing scale as a total weight;
a radio tag reading section configured to, in response to the weighing section beginning to weigh a first container and a second container of the plurality of containers, initiate communication with a first radio tag attached to the first container and a second radio tag attached to the second container, and read out, in a non-contact manner, first tag data of the first radio tag and second tag data of the second radio tag, wherein the first tag data comprises a first chemical substance identification code indicating first content in the first container and first compound data identifying one or more chemical substances which are able to be safely compounded with the first content, and wherein the second tag data comprises a second chemical substance identification code indicating second content in the second container and second compound data identifying one or more chemical substances which are able to be safely compounded with the second content;
a compound determination section configured to determine whether the first chemical substance identification code is contained in the second compound data; and
an informing section configured to notify a first result indicating that the first content is safely compoundable with the second content in response to a determination by the compound determination section that the first chemical substance identification code is contained in the second compound data, and to notify a second result indicating that the first content is not safely compoundable with the second content in response to a determination by the compound determination section that the first chemical substance is not contained in the second compound data.

2. The apparatus according to claim 1, further comprising a radio tag data counter configured to count a number of tag data read by the radio tag reading section, wherein a count value of the radio tag data counter is increased by one in response to the radio tag reading section reading out tag data from any of the radio tags.

3. The apparatus according to claim 2, further comprising a memory configured to stores the first tag data and the second tag data read out by the radio tag reading section at an address thereof corresponding to the count value of the radio tag data counter.

4. The apparatus according to claim 1, wherein the informing section is further configured to display a total number of radio tags read out by the radio tag reading section in response to the result indicating that the first content is safely compoundable with the second content.

5. The apparatus according to claim 1, further comprising a user determination section configured to determine whether the first tag data or the second tag data includes data specifying a user, the compound determination section being operated in response to a determination by the user determination section that the data specifying the user is included in the first tag data or the second tag data.

6. The apparatus according to claim 1, wherein the radio tag reading section comprises a plurality of antennas arranged such that the plurality of antennas surround the weighing scale to form a communication area with the first radio tag and the second radio tag above the weighing scale.

7. The apparatus according to claim 6, wherein the plurality of antennas include a planar antenna.

8. The apparatus according to claim 1, wherein the at least one of the first compound data or the second compound data indicates a material that is inhibited from being compounded with at least one of the first content or the second content.

9. The apparatus according to claim 1, further comprising a display section configured to display the total weight measured on the weighing section.

10. An article management system which manages whether respective content of a plurality of containers is compoundable with one another, comprising:

a weighing scale;
a weight detecting section configured to measure a total weight of the plurality of containers in response to the plurality of containers being placed on the weighing scale;
radio tags respectively attached to the plurality of containers, the radio tags respectively comprising a memory storing a chemical substance identification code and compound data, the chemical substance identification code identifying content of a container and the compound data indicating a set of chemical substances which are able to be safely compounded with the content;
a radio tag reading section configured to, in response to a determination that the weight detecting section has begun to weigh a first container and a second container of the plurality of containers, read out, in a non-contact manner, first tag data including a first chemical substance identification code and first compound data from a first of the radio tags attached to the first container, and second tag data including a second chemical substance identification code and second compound data from a second of the radio tags attached to the second container;
a compound determination section configured to determine whether the first chemical substance identification code is included in the second compound data; and
an informing section configured to notify a first result indicating that first content identified by the first chemical substance identification code is safely compoundable with second content identified by the second chemical substance identification code in response to a determination by the compound determination section that the first chemical substance identification code is included in the second compound data, and to notify a second result indicating that first content is not safely compoundable with second content in response to a determination by the compound determination section that the first chemical substance identification code is not included in the second compound data.

11. The system according to claim 10, wherein the compound data stored in the memory of the radio tags indicates a material safely compoundable with content housed in one of the containers.

12. The system according to claim 10, wherein the compound data stored in the memory of the radio tags indicates a material that is prohibited from being compounded with content housed in one of the containers.

13. The system according to claim 10, wherein the radio tag reading section is further configured to read tag data from a radio tag in response to a container on which the radio tag is affixed being placed on the weighing scale.

14. The system according to claim 13, wherein the radio tag reading section comprises a plurality of antennas arranged such that the antennas surround the weighing scale to form a communication area with the radio tag above the weighing scale.

15. The system according to claim 14, wherein the plurality of antennas include a planer antenna.

16. The system according to claim 10, further comprising a user radio tag comprising data specifying a user, the data being read out by the radio tag reading section.

17. The system according to claim 16, further comprising a user determination section configured to determine whether tag data read out by the radio tag reading section includes the data specifying a user, the compound determination section being operated in response to the user determination section determining that the data specifying the user is included in the tag data read out by the radio tag reading section.

18. The system according to claim 10, further comprising a display section configured to display the total weight of the plurality of containers.

* * * * *